Patented Apr. 2, 1935

1,996,362

UNITED STATES PATENT OFFICE 1,996,362

SOLDERING FLUX

Conral C. Callis and Ralph B. Derr, Oakmont, Pa., assignors to Aluminum Company of America, Pittsburgh, Pa., a corporation of Pennsylvania No Drawing. Application December 29, 1932, Serial No. 649,325

13 Claims. (Cl. 148—23)

This invention relates to soldering fluxes for use in the joining of metals and to methods of joining metals by soldering. The invention is particularly concerned with the soldering of aluminum and aluminum base alloys and other metals presenting difficult soldering problems.

The usual soldering flux is a pulverized salt or mixture of salts such as, for instance, zinc chloride, ammonium chloride, etc. In granular or powdered form the flux is often difficult to apply to the work. Consequently it has been customary to mix the flux with aqueous solutions, grease, oils, waxes or the like to form a paste or liquid which is more readily applied. The vehicles heretofore mixed with the flux are not, however, wholly satisfactory. Some of them vaporize below the soldering temperature and do not spread the flux over the work. Others carbonize to a substantial extent at or below the soldering temperatures, deposit a carbonaceous residue, and increase the difficulty of making a satisfactory joint. Others do not adequately serve the intended purpose for these and related reasons.

We have found that the chlorinated diphenyls and chlorinated naphthalenes form a satisfactory vehicle with which to mix or in which to suspend fluxing salts so as to insure a positive spread of the flux upon the work and to obtain other or similar advantages. Chlorinated diphenyls are a class of substances ranging, in physical form, from liquids to solids, from mobile oils to thermoplastic resins. Chlorinated naphthalenes are a class of substances ranging, in physical form, from liquids to solids, from mobile oils to heavy waxes. In its broader aspects the invention comprehends vehicles which contain any of the forms of chlorinated diphenyls and chlorinated naphthalenes.

Our invention contemplates, therefore, a flux containing chlorinated diphenyl, chlorinated naphthalene, and fluxing salts. We have found that when fluxing salts are mixed with or suspended in chlorinated diphenyl and chlorinated naphthalene mixtures, the result is a flux which spreads readily on the work, delivers to the work a uniform coating of the fluxing salts, and materially promotes ease of soldering and the production of sound joints. In such a flux the chlorinated naphthalene, for best results, should not exceed 4 parts to 1 part of chlorinated diphenyl, by weight, and in the preferred practice of the invention a ratio not greater than 2 parts of chlorinated naphthalene to 3 parts of chlorinated diphenyl is used.

When chlorinated diphenyl and chlorinated naphthalene mixtures are employed they promote the uniform spreading of the fluxing salts with which they are mixed, insure that the work is uniformly coated with the salts, and are generally beneficial in promoting the fluxing action and, consequently, the soldering action. Under their influence the solder flows more readily, and it is readily observed that when they are present in the flux the soldering operation proceeds more smoothly and with greater ease. Carbonization on any substantial scale is not observed and difficulties from this source are practically eliminated.

The various conditions under which soldering is done make desirable the use of fluxes of different physical characteristics. If a highly mobile or fluid flux is not necessary, a suitable flux may be provided by mixing together solid or viscous chlorinated diphenyl, solid or viscous chlorinated naphthalene, and the granular or pulverized fluxing salts, this mixture being applied directly to the work. The soldering temperatures employed will melt the solid chlorinated diphenyl and chlorinated naphthalene and being thus in highly mobile form these substances will cause the flux to uniformly cover the work.

In many instances, however, it is desirable that the flux be more or less liquid and in such case the flux may be formed by suspending the fluxing salts in a fluid containing chlorinated diphenyl and chlorinated naphthalenes. Fluidity is desired in order that the flux may be more readily applied but the degree of fluidity (using this term as including viscosity as well) is also of importance since a substantial proportion of the fluxing salts which are mixed with the fluid containing chlorinated diphenyl and chlorinated naphthalene should remain suspended therein for a period of time (after mixing or shaking) to allow the application of the flux to the work. This is desirable in order that a uniform coating of the fluxing salts may be delivered to the work. To obtain a fluid mixture of chlorinated diphenyl and chlorinated naphthalene, the liquid forms of these substances may be mixed together or solid forms may be mixed with liquid forms to compound a liquid whole. In this manner it is possible to secure suitable fluidity, and often the best degree of fluidity, but in the event that the resultant fluidity is not that desired, it may be adjusted by adding to the mixture a thinner in the form of an organic solvent. Likewise viscous or solid mixtures or chlorinated diphenyl and chlorinated naphthalene may be made fluid and this fluidity adjusted by adding to the mixture a thinner in the form of an organic solvent.

The thinning agents by which the fluidity of the chlorinated diphenyl-chlorinated naphthalene mixture may be adjusted are the organic solvents, comprehending, among other substances, benzol, toluol, xylol and like aromatic hydrocarbons, carbon tetrachloride, cyclo-hexanol, mineral oils (preferably highly refined) and other similar solvents. Thus in one form the invention contemplates the use of a flux containing mixtures of chlorinated diphenyl and chlorinated naphthalene the fluidity of which has been adjusted by an organic solvent.

An important consideration in the practice of our invention is the temperature at which the soldering takes place. At relatively high soldering temperatures it is preferable to use fluxes containing those forms of chlorinated diphenyls and chlorinated naphthalenes which have the higher boiling or volatilizing ranges. Since such forms are in general solid, viscous or wax-like, as the case may be, it is usually necessary to adjust their fluidity if a fluid flux is desired. For this purpose an organic solvent may be used, as stated above.

It is convenient to use a flux which has an initial fluidity of the order desired and which needs no further adjustment in that respect to adapt it to general purposes. In experimenting with fluxes of the general nature herein described to produce an all-purpose flux and one which is particularly useful for high temperature work, we have found that a fluid flux of high boiling range can be obtained by mixing together the solid forms of chlorinated diphenyl, the wax-like form of chlorinated naphthalene, and a third solid substance,— para - dichlor - benzene. Although these substances be taken in the form of solids of relatively high boiling points they produce in certain proportions a mixture which is fluid at ordinary temperatures. The sudden change of the three solids to a fluid by simple mixing does not appear to be the result of chemical reaction. Regardless, however, of the cause of the physical change, the mobile mixtures produced retain the high boiling characteristics of their components and have a fluidity which, in the usual case, will be of such order as to hold in suspension a substantial part of the fluxing salts mixed therewith. Such mixtures are particularly adapted to soldering at relatively high temperatures because they retain in a fluid state the high boiling ranges of their solid components. These mobile mixtures of solid chlorinated diphenyl, solid chlorinated naphthalene, and para-dichlor-benzene are obtained when the solids named are mixed in the following proportions: 45 to 75 per cent of solid or resinous chlorinated diphenyl, 10 to 20 per cent of solid or wax-like chlorinated naphthalene, and 10 to 35 per cent of para-dichlor-benzene. Within this composition range the mixtures obtained are mobile and fluid at room temperature and, for ordinary purposes, their fluidity need not be further adjusted. When, however, a specific fluidity is desired which is not possessed by the particular mixture, such fluidity can be obtained by the addition of an organic solvent. If the three substances are mixed together outside of the composition ranges above mentioned, their usefulness in other respects as a part of the flux is retained but if a liquid flux is desired it is necessary to adjust the fluidity of the mixture by means of a suitable solvent. Thinning agents by which the fluidity may be adjusted are the organic solvents, comprehending, among other substances, benzol, toluol, xylol, and like aromatic hydrocarbons, carbon tetrachloride, cyclo-hexanol, mineral oils (preferably highly refined), and similar solvents. Thus in one form the invention contemplates the use of a flux containing chlorinated diphenyl and chlorinated naphthalene, with or without para-dichlor-benzene, the fluidity of which is adjusted by an organic solvent.

We do not claim broadly the use of chlorinated diphenyl, since that is the sole invention of Conral C. Callis and is claimed in his copending application Serial No. 649,324, filed December 29, 1932. Nor do we claim herein broadly the use of chlorinated diphenyl and para-dichlor-benzene, but do so in our copending application Serial No. 649,326, filed December 29, 1932.

We claim—

1. In a method of soldering, the step of applying to the metal to be soldered a flux containing as a vehicle chlorinated diphenyl and chlorinated naphthalene, and fluxing salt suspended therein.

2. In a method of soldering, the step of applying to the metal to be soldered a flux containing as a vehicle chlorinated diphenyl and chlorinated naphthalene, and fluxing salt suspended therein, the fluidity of the flux having been adjusted with organic solvent.

3. In a method of soldering, the step of applying to the metal to be soldered a flux containing chlorinated diphenyl, chlorinated naphthalene, and para-dichlor-benzene.

4. In a method of soldering, the step of applying to the metal to be soldered a flux containing chlorinated diphenyl, chlorinated naphthalene, and para-dichlor-benzene, the fluidity of the flux having been adjusted with organic solvent.

5. In a method of soldering, the step of applying to the metal to be soldered a flux containing solid chlorinated diphenyl, solid chlorinated naphthalene, and para-dichlor-benzene in the following proportions: 45 to 75 per cent of solid chlorinated diphenyl, 10 to 20 per cent of solid chlorinated naphthalene, and 10 to 35 per cent of para-dichlor-benzene.

6. In a method of soldering, the step of applying to the metal to be soldered a flux containing solid chlorinated diphenyl, solid chlorinated naphthalene, and para-dichlor-benzene in the following proportions: 45 to 75 per cent of solid chlorinated diphenyl, 10 to 20 per cent of solid chlorinated naphthalene, and 10 to 35 per cent of para-dichlor-benzene, the fluidity of the flux having been adjusted with organic solvent.

7. A soldering flux containing as a vehicle chlorinated diphenyl and chlorinated naphthalene, and fluxing salt suspended therein.

8. A soldering flux containing chlorinated diphenyl, chlorinated naphthalene, and para-dichlor-benzene.

9. A soldering flux containing as a vehicle chlorinated diphenyl, and chlorinated naphthalene, and fluxing salt suspended therein, the fluidity of the flux having been adjusted with organic solvent.

10. A soldering flux containing chlorinated diphenyl, chlorinated naphthalene, and para-dichlor-benzene, the fluidity of the flux having been adjusted with organic solvent.

11. A soldering flux containing fluxing salts and a vehicle, said vehicle being the result of mixing together solid chlorinated diphenyl, solid chlorinated naphthalene, and para-dichlor-benzene within the following proportions: 45 to 75 per cent of solid chlorinated diphenyl, 10 to 20 per cent of solid chlorinated naphthalene, and 10 to 35 per cent of para-dichlor-benzene.

12. A soldering flux containing fluxing salts and a vehicle, said vehicle being the result of mixing together solid chlorinated diphenyl, solid chlorinated naphthalene, and para-dichlor-benzene within the following proportions: 45 to 75 per cent of solid chlorinated diphenyl, 10 to 20 per cent of solid chlorinated naphthalene, and 10 to 35 per cent of para-dichlor-benzene, the fluidity of the flux having been adjusted with organic solvent.

13. A soldering flux containing a mixture of chlorinated diphenyl and chlorinated naphthalene which is more mobile than its constituents singly.

CONRAL C. CALLIS.
RALPH B. DERR.